April 7, 1931.  A. C. JOHNSTON  1,799,299
DUPLEX SCREEN
Filed Aug. 9, 1926  4 Sheets-Sheet 1

Inventor
Arthur C. Johnston
by Parker a Carter
Attorneys.

April 7, 1931. A. C. JOHNSTON 1,799,299
DUPLEX SCREEN
Filed Aug. 9, 1926 4 Sheets-Sheet 2

Inventor
Arthur C. Johnston
by Parker Carter
Attorneys

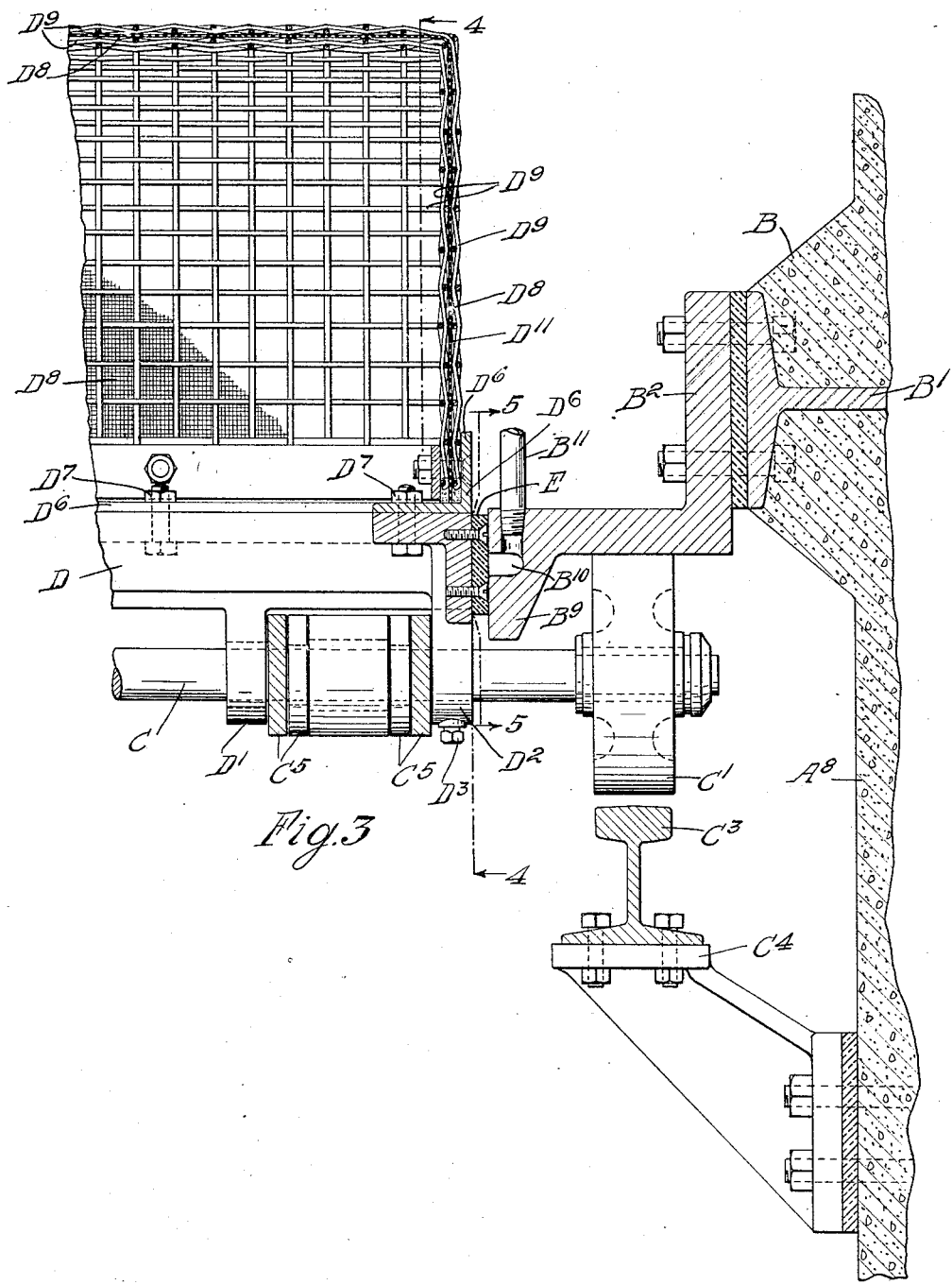

April 7, 1931.  A. C. JOHNSTON  1,799,299
DUPLEX SCREEN
Filed Aug. 9, 1926  4 Sheets—Sheet 4
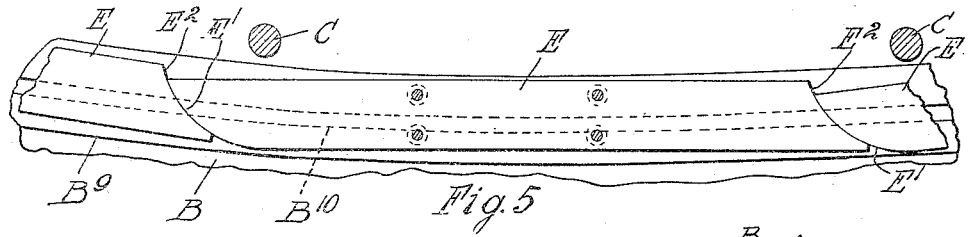
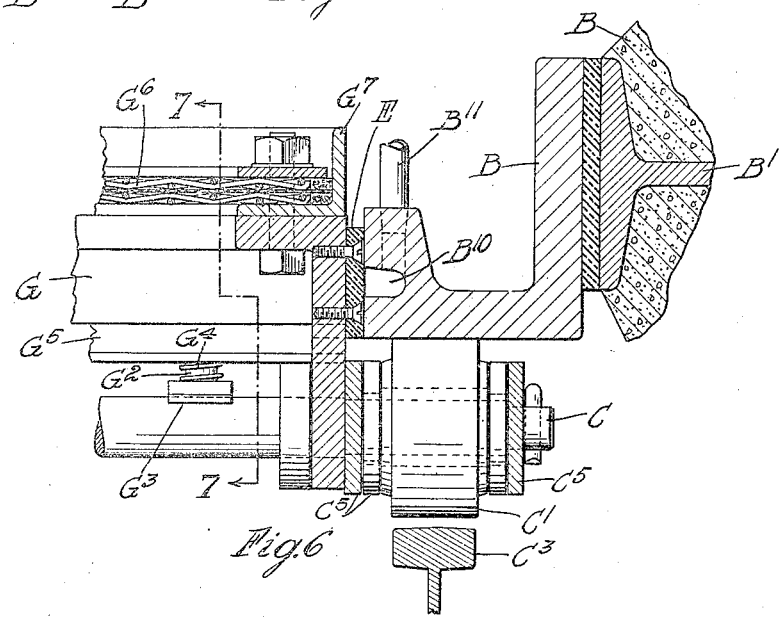

Patented Apr. 7, 1931

1,799,299

UNITED STATES PATENT OFFICE

ARTHUR C. JOHNSTON, OF CHICAGO, ILLINOIS, ASSIGNOR TO LINK-BELT COMPANY, OF CHICAGO, ILLINOIS, A CORPORATION OF ILLINOIS

DUPLEX SCREEN

Application filed August 9, 1926. Serial No. 128,091.

My invention relates to screens for water and the like wherein an endless screen passes through the water or other liquid to be screened and wherein the liquid always passes through the screen in the same direction and wherein any refuse material screened out is always contained on the upstream side of the screening surface, whereby as the screen elements are cleaned and pass out of the liquid and back to it any refuse which may adhere to the screens will always return to the up-stream or dirty side and never be allowed to escape to the downstream or clean side. Other objects will appear from time to time throughout the specification and claims.

My invention is illustrated more or less diagrammatically in the accompanying drawings, wherein—

Figure 3 is a typical cross section through one side of the screen;

Figure 5 is a diagrammatic section with parts omitted along the line 5—5 of Figure 3; showing the arrangement of the water sealed wearing strips;

Figure 6 is a section similar to Figure 3 showing a modified form;

Figure 7 is a section along the line 7—7 of Figure 6;

Figure 8 is a section through abutting screen panels showing a modified form of packing.

Like parts are indicated by like characters throughout the specification and drawings.

A is a well or pit of concrete or other suitable material. It is preferably divided into a plurality of chambers; $A^1$ a valve chamber, $A^2 A^2$ screen chambers, and $A^3$ a discharge chamber. Refuse bearing water or other liquid is fed to the valve chamber $A^1$ through and controlled by the gate valves $A^4$. From this chamber it is discharged through the passage $A^5$ in the wall $A^6$ into one of the screen chambers $A^2$. Water also passes through the wall $A^6$, thimble $A^7$ extending through one of the chambers $A^2$, and the wall $A^8$ into the furthermost screen chamber $A^2$. The chambers $A^2 A^2$ are divided by an endless screen, shown diagrammatically at $A^9$ $A^9$ into two separate compartments, the inner refuse compartment being enclosed by the screen is that part of the chamber into which the refuse laden water is fed through the ports $A^5$ and thimble $A^7$. The outer or clean water compartment discharges the clean water through the outlet ports $A^{10} A^{10}$ into the chamber $A^3$ whence the water is discharged through the port $A^{11}$ to any suitable point. The arrangement of the two screen groups in each of the two screen chambers $A^2 A^2$ is identical and a description of one will suffice for both.

Figure 1:
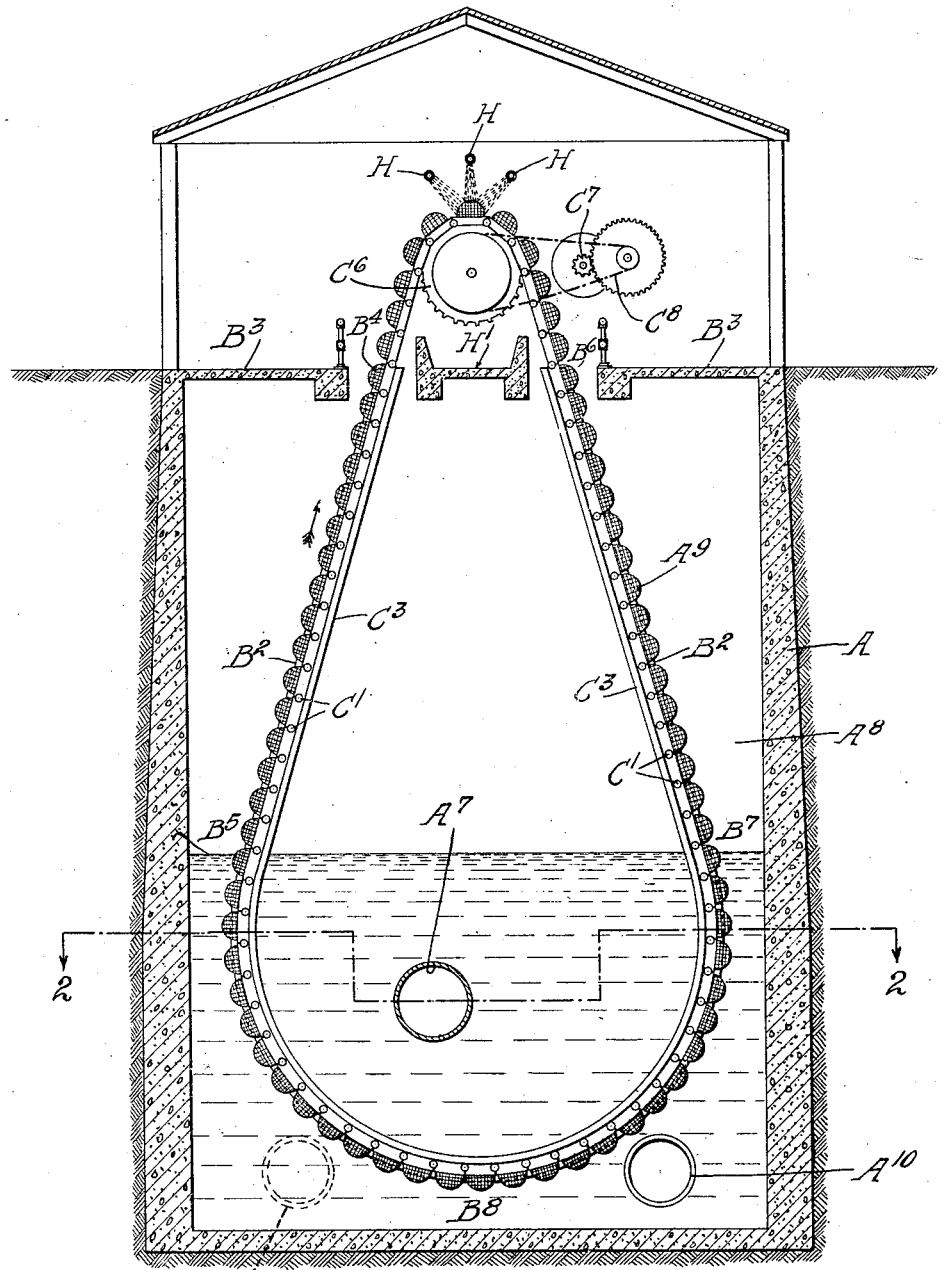
Figure 1 is a section through the water well showing the position of the screening elements.
Figure 2:
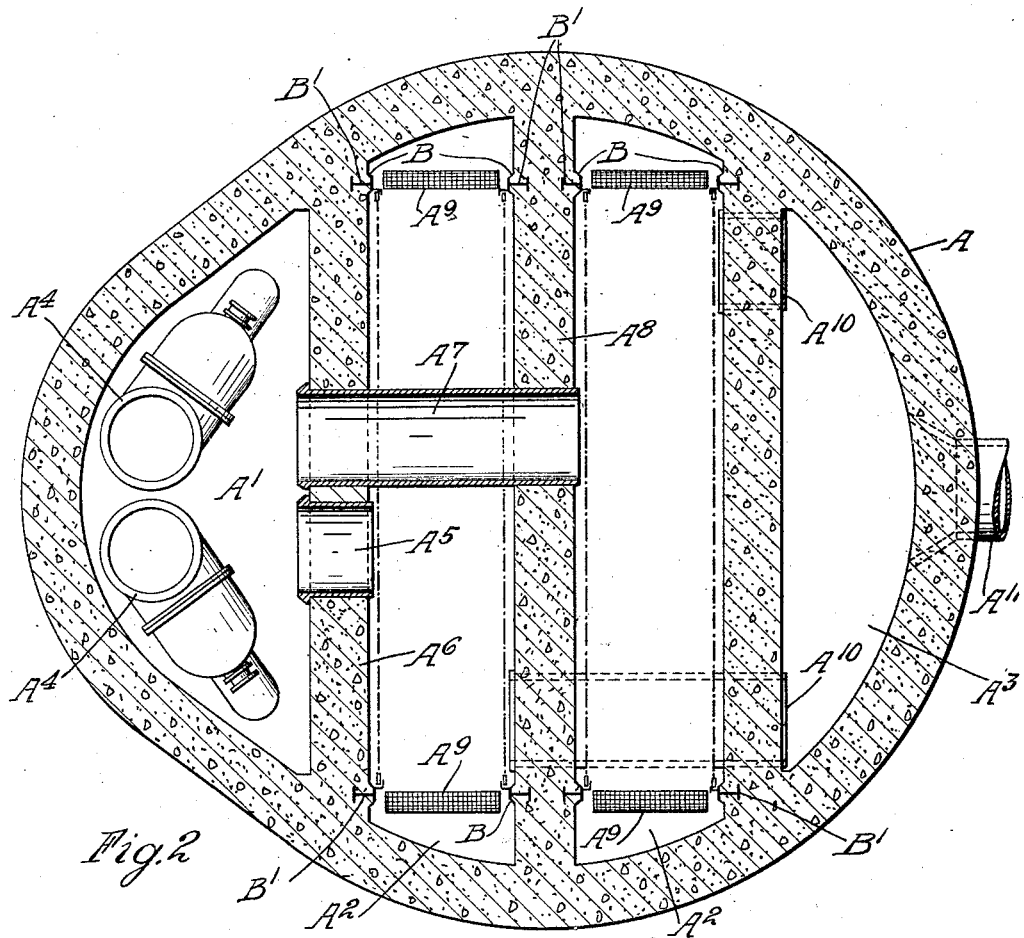
Figure 2 is the section along the line 2—2 of Figure 1.

Projecting inwardly from the tank wall $A^8$ is a shoulder B reinforced by an anchor beam $B^1$. Bolted on this anchor beam is a track angle $B^2$. This track angle extends from the upper floor line of the working floor $B^3$ first outwardly and downwardly in two directions between the points $B^4 B^5$ and $B^6$ $B^7$ so as to guide the chains along a straight line. From the points $B^5$ through $B^6$ to $B^7$ however, this track angle is curved about an arc of a circle so that the chain traveling around this track angle will be in a substantially pear-shaped contour as indicated in Figure 1. This track angle has on its face projecting away from the tank wall a bearing and packing flange $B^9$ slotted as indicated at $B^{10}$ and adapted to be fed with water under pressure through a pipe $B^{11}$.

Roller shafts C C carry at their end rollers $C^1$ engaging the track angles $B^2$ and held thereagainst by guide rails $C^3$ supported on brackets $C^4$ from the tank wall. These roller shafts form the pintles for two endless chains $C^5 C^5$, there being one chain at either end of the roller shafts adjacent opposed walls $A^6$ $A^8$. These chains travel around sprockets $C^6$ at their upper ends, the sprockets being driven from a motor $C^7$ from a drive chain $C^8$ in the usual manner. The direction of movement of the chain is in the direction of the arrow shown on the left side of Figure 1.

Figure 4:
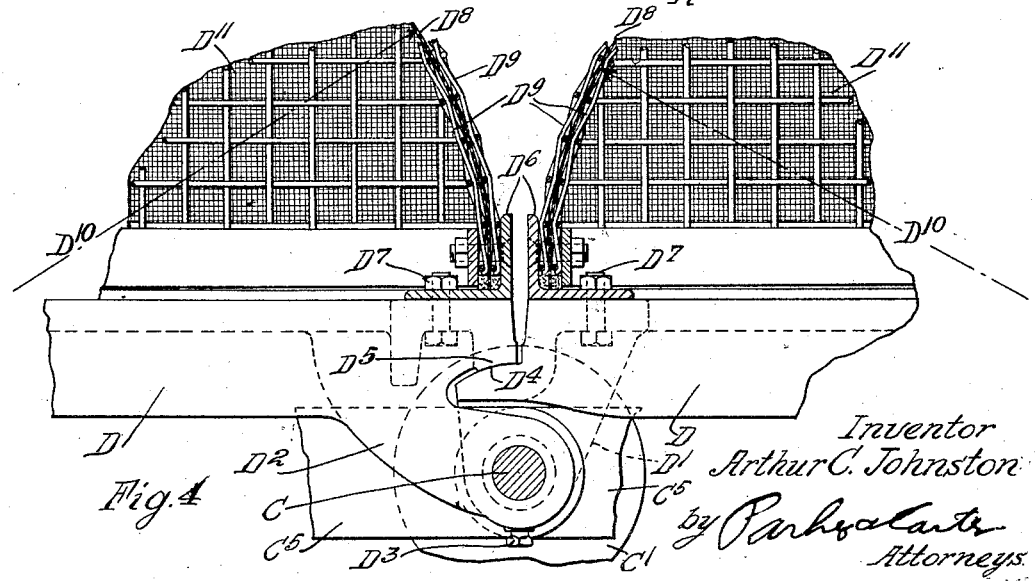
Figure 4 is a section along the line 4—4 of Figure 3.

D D are trays of cast steel or other suitable material having at either end downwardly extending lugs $D^1$ $D^2$, the lug $D^2$ being apertured to engage the shaft C and located thereon by means of a set screw $D^3$, the lug $D^1$ being loosely bushed on the shaft. At the end of the tray adjacent the lug $D^2$ is a curved packing surface $D^4$ concentric with the shaft. Overlying this, there is a flange $D^5$ on the opposed end of the adjacent tray having a surface to engage the surface $D^4$ so that angular rotation of the two trays by the common center of the roller shaft will result in movement of these two packing or engaging surfaces without separation of the trays. These trays or frames are open as indicated and carry screen panels comprising angle frame members $D^6$ held to the tray by means of the bolts $D^7$ and carrying fine screen cloth $D^8$ backed and supported by coarse mesh screen cloth panels $D^9$ $D^9$. The screen is semi-cylindrical in cross section and extends upward from the tray D, the screen being curved upwardly around a radius as indicated at $D^{10}$. The ends of the semi-cylindrical screen are closed by flat panels $D^{11}$ so that each tray carries a semi-cylindrical screen box, thereby giving greatly increased screening surface as is desirable when very fine screens are used to separate out very fine particles. Under some circumstances, of course, the fine screen would be done away with and the coarseness of the screen cloth would vary depending upon the conditions of operation, and the type of material to be screened. Since the water passes through the screen in the direction shown by the arrow of Figure 4, the rollers and other parts will be exposed to the refuse laden water but that will be of no consequence and the separation of the screen panels as the trays rotate or are angularly displaced while passing around the curved guide track will be of no consequence because the gap between them will be closed owing to the engagement of the two concentric surfaces on opposed trays concentric with the pintle or roller shaft.

Interposed between the flange $B^9$ and the edge of each tray D are a series of separate water sealed wearing strips E. These strips are mounted on the trays and travel with them. They may be made of rubber or other suitable material and each of them has a concave end $E^1$ adapted to be engaged by a convex end $E^2$ so that as the chain travels around the guide track, these wearing strips will be allowed a certain amount of play to permit their traveling with the chain but will not be enabled to open a passage for the water. The water packing in the channel $B^{10}$ cooperating with these rubber or other suitable sealing strips will prevent water passing between the track flange and the trays thereby forcing all the refuse laden water to pass through the screens.

In the modified form shown in Figure 8, the closure between adjacent trays is independent of the lugs supporting them on the cross rod pintle or roller axle. It takes the form of a relatively thin curved metallic, preferably brass sealing plate F. This plate bridges the gap between adjacent screen panels or trays. It is so shaped that it has one contact at $F^1$ with one of the trays, a curved contact at $F^2$ with the other and is held in position by means of the tap screw $F^3$ and yieldingly pressed against the smooth surface of the two trays by means of the spring $F^4$, the tension of which is adjusted by the nut $F^5$.

In the modified form shown in Figures 6 and 7, the structure is still different in that the opposed edges of the trays have downwardly extending flanges G $G^1$. Associated with the flange $G^1$ are pins $G^2$ having a stirrup $G^3$ adapted to engage the pintle or roller shaft C. A packing strip is positioned by the pin $G^2$ and yieldingly held against the flange $G^1$ by the spring $G^4$. It has a curved extension $G^5$ adapted to engage the edge of the flange G no matter what the position of that flange. In this case the screen panel $G^6$ is parallel with and lying upon the tray being mounted on an angle $G^7$.

As the screens pass over the sprocket $C^6$, the separate panels are exposed to a water spray from the high pressure pipes H H and the refuse which has been lodged on the underside of the screen panels is discharged by this spray into the trough $H^1$ whence it runs off to a refuse station not here shown as it forms no part of the present invention.

It will be evident that while I have shown in my drawings an operative device, still many changes might be made in the size, shape, number, arrangement and disposition of parts without departing materially from the spirit of my invention and I wish, therefore, that my showing be taken as in a sense diagrammatic.

The use and operation of my invention are as follows:

The refuse laden water is fed into the interior of the duplex screen and this water passes out in several directions through the screen, some of the refuse being deposited on the inside of the screen panels. There is thus a body of refuse laden water within the screen, clean water outside. The refuse which is carried up by the panels as they travel toward the top of the system is washed off or under the inner sides of the screen panels and discharged into the refuse trough. Any refuse which may by chance adhere to the screen and not be washed off or any refuse which may slop over from the refuse trough will return again to the refuse zone and will not have a chance to pass out with the clean water as is the case when water passes through the screens in first one and then another direction, in such installations as those where the screen forms merely a barrier through which the water must pass. The result of this is that all of the immersed portion of the screen instead of merely half of it is working all the time and there is no opportunity for dirt and refuse to escape even by accident through or around or over the screen.

I claim:

1. A screen assembly comprising an endless chain, track rollers and screen trays rotatably mounted on the chain pintles, a track along which the rollers travel, screen panels carried by the trays, a fixed abutment arranged along the line of travel of the trays, packing strips mounted on the sides of the trays and adapted to travel along the abutment, each strip being concave at one end and convex at the other whereby strips on adjacent trays are interlocked and maintain packing contact with each other independent of the angular position of the trays.

2. A screen assembly comprising an endless chain, track rollers and screen trays rotatably mounted on the chain pintles, a track along which the rollers travel, screen panels carried by the trays, packing means interposed between the ends of adjacent trays to positively close the gap between them independent of their angular relation, a fixed abutment arranged along the line of travel of the trays, packing strips mounted on the sides of the trays and adapted to travel along the abutment, each strip being concave at one end and convex at the other whereby strips on adjacent trays are interlocked and maintain packing contact with each other independent of the angular position of the trays.

3. A screen assembly comprising an endless chain, track rollers and screen trays rotatably mounted on the chain pintles, a track along which the rollers travel, screen panels carried by the trays, a fixed abutment arranged along the line of travel of the trays, packing strips mounted on the sides of the trays and adapted to travel along the abutment, each strip being concave at one end and convex at the other whereby strips on adjacent trays are interlocked and maintain packing contact with each other independent of the angular position of the trays, there being a channel in the abutment closed by the packing strips and means for supplying liquid under pressure to said channel to prevent the passage of foreign liquid through the space between the abutment and the packing strips.

4. A screen assembly comprising an endless chain, track rollers and screen trays rotatably mounted on the chain pintles, a track along which the rollers travel, screen panels carried by the trays, packing means interposed between the ends of the adjacent trays to positively close the gap between them independent of their angular relation, a fixed abutment arranged along the line of travel of the trays, packing strips mounted on the sides of the trays and adapted to travel along the abutment, each strip being concave at one end and convex at the other whereby strips on adjacent trays are interlocked and maintain packing contact with each other independent of the angular position of the trays, there being a channel in the abutment closed by the packing strips and means for supplying liquid under pressure to said channel to prevent the passage of foreign liquid through the space between the abutment and the packing strips.

Signed at Chicago, county of Cook and State of Illinois, this 2nd day of August, 1926.

ARTHUR C. JOHNSTON.